United States Patent [19]

Steven

[11] 3,940,313
[45] Feb. 24, 1976

[54] DEVICE FOR DETECTING DEFECTIVE NUCLEAR REACTOR FUEL RODS

[75] Inventor: Josef Steven, Erlangen, Germany

[73] Assignee: Siemens Aktiengesellschaft, Munich, Germany

[22] Filed: Nov. 21, 1973

[21] Appl. No.: 418,009

Related U.S. Application Data

[63] Continuation of Ser. No. 240,511, April 3, 1972, abandoned.

[52] U.S. Cl. .................. 176/68; 176/80; 176/19 LD
[51] Int. Cl. ............................................. G21c 3/16
[58] Field of Search .......... 176/80, 68, 19 LD, 19 R

[56] References Cited
UNITED STATES PATENTS

| | | | |
|---|---|---|---|
| 2,855,355 | 10/1958 | Ohlinger et al. | 176/80 |
| 3,644,174 | 2/1972 | Ferrari | 176/68 |
| 3,666,625 | 5/1972 | Nybo | 176/80 |

FOREIGN PATENTS OR APPLICATIONS

| | | | |
|---|---|---|---|
| 1,100,723 | 1/1968 | United Kingdom | 176/19 LD |
| 900,348 | 7/1962 | United Kingdom | 176/19 R |

OTHER PUBLICATIONS

*Hackh's Chemical Dictionary*, McGraw–Hill Book Co., Fourth Ed., p. 417.

*Primary Examiner*—Harvey E. Behrend
*Attorney, Agent, or Firm*—Kenyon & Kenyon Reilly Carr & Chapin

[57] ABSTRACT

A moisture sensor is provided for a nuclear fuel rod for water-cooled nuclear reactors wherein moisture can be present. The fuel rod has an end cap and a charge of nuclear fuel. The moisture sensor is disposed between the end cap and the charge and serves to detect a leak in the fuel rod. The moisture sensor includes a capsule-like housing having an inner space and having openings through which moisture can pass into the inner space in the event of a leak in the fuel rod. Ferromagnetic material is disposed in the inner space of the housing together with a moisture detector responsive to moisture for altering the disposition of the ferromagnetic material in the inner space.

5 Claims, 6 Drawing Figures

DEVICE FOR DETECTING DEFECTIVE NUCLEAR REACTOR FUEL RODS

This is a continuation of application Ser. No. 240,511, filed Apr. 3, 1972, now abandoned.

BACKGROUND OF THE INVENTION

1. Field of the Invention

The invention relates to a nuclear fuel rod for a water-cooled nuclear reactor and to means for detecting leaks in the fuel rod. More particularly, the invention relates to such a fuel rod equipped with a detection device disposed inside the rod for detecting a leak.

2. Description of the Prior Art

Previously, it has been only possible to examine fuel cells for leaks as a whole. Since the fuel cells are constructed with plurality of individual fuel rods, it is relatively difficult to find the individual defective fuel rod or rods in the fuel cell that have been ascertained as faulty. It is known to provide a ferromagnetic body inside the nuclear reactor fuel rod. The ferromagnetic body includes a mounting mechanism which is destroyed by cooling water entering in the event of damage, so that the ferromagnetic body can drop from its original position to the end of the nuclear fuel column situated in the fuel rod. This change of location can then be detected by magnetic measuring techniques without removing the fuel rod from the fuel cell assembly. In this connection, reference may be had to U.S. Pat. application, Ser. No. 885,407 filed on Dec. 16, 1969.

This solution, however, is relatively complicated and the reliability of operation cannot be considered as 100 percent. The need therefore existed for other means to detect defective fuel cells.

SUMMARY OF THE INVENTION

It is an object of the invention to provide a detection device for detecting leaks in nuclear fuel rods. It is another more specific object of the invention to provide a moisture sensor that can be positioned in the fuel rod for detecting moisture that penetrates into the rod in event of a leak therein.

According to the invention, a moisture sensor is provided for a nuclear fuel rod of a water-cooled nuclear reactor. The fuel rod has an end cap and a charge of nuclear fuel. The moisture sensor is disposed between the end cap and charge and has a capsule-like housing having an inner space. Inlet means in the form of openings are provided in the housing through which moisture can pass in the event of a leak in the fuel rod. A ferromagnetic material is disposed in the inner space of the housing together with moisture detection means responsive to moisture for altering the disposition of the ferromagnetic material in this inner space.

In a preferred embodiment of the invention, the moisture detection means is a pressed body made of the ferromagnetic material and an other material that decomposes and expands in volume when subjected to moisture. In addition, the housing is made of water-resistant material.

According to an alternate embodiment of the invention, the ferromagnetic material is in the form of particles and the moisture detection means is a cup-like container made of non-magnetic, water resistant material. The container is filled with the particles and is freely movable in the inner space of the housing. The detection means includes a lid covering the container, the lid being made of a pressed material different from the ferromagnetic material. The material of the lid is such that the lid decomposes and expands in volume in response to moisture so as to lock the container with the particles contained therein in position in the housing.

The decomposable material consists of powdered aluminum and water-soluble organic or inorganic mercury compounds such as mercury nitrate, mercury iodide or aluminum amalgam. The mercury compounds act here essentially as catalysts for the decomposition of the aluminum powder, which is accompanied by a corresponding increase in volume, especially since the original pressed bodies disintegrate because of these phenomena.

Although the invention is illustrated and described herein as a device for detecting defective nuclear reactor fuel rods, it is nevertheless not intended to be limited to the details shown, since various modifications may be made therein within the scope and the range of the claims. The invention, however, together with additional objects and advantages will be best understood from the following description and in connection with the accompanying drawing.

BRIEF DESCRIPTION OF THE DRAWING

FIG. 1a shows the condition of the sensor when the fuel rod is intact, and FIG. 1b, the condition of the sensor obtaining in the event of a leak in the fuel rod.

FIGS. 2a and 2b show the intact and defective conditions of the fuel rod respectively.

FIGS. 3a and 3b likewise illustrate the intact and defective conditions of the fuel rod respectively.

DESCRIPTION OF THE PREFERRED EMBODIMENTS

Figure 1A:
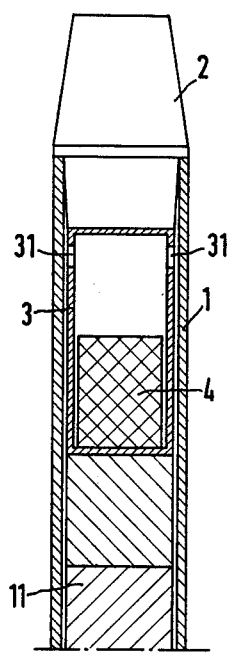
FIGS. 1a and 1b illustrate an elevation view, in section, of the end portion of a fuel rod equipped with a moisture sensor according to the invention. In this embodiment, the moisture sensor is provided with moisture detection means in the form of a compact body.
Figure 1B:
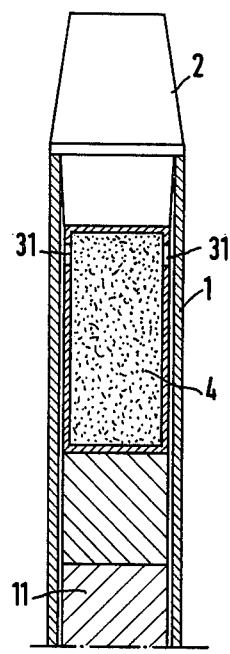

Referring now to the drawing, FIG. 1 shows the upper end of a fuel rod which comprises tubular jacket 1, the nuclear fuel charge 11 and the end cap 2 for sealing off the end of the jacket 1. In this embodiment, a non-magnetic capsule-like housing or capsule 3 is inserted between the fuel charge 11 and the end cap 2. The capsule 3 has inlet means in the form of bores 31 and, within the capsule, there is provided a compact body 4. The compact body 4 comprises a pressed mixture of aluminum powder and a water-soluble organic or inorganic mercury compound such as mercury nitrate. The compact body 4 also contains ferromagnetic material. In the event of a leak in the jacket 1, moisture enters into the interior of the fuel rod and, therefore, also through the holes 31 of the capsule 3. This causes the pressed compact body 4 to disintegrate and undergo an increase in volume and fill practically the entire interior of the capsule 3 as shown in FIG. 1b. This means that the ferromagnetic component of the body 4, which component consists, for example, of iron powder, has a substantially lower spatial concentration or density than it had before the moisture entered the capsule; this new condition can be determined by magnetic means, for instance, by measuring the magnetic reluctance from the outer side of the fuel rod.

Figure 2A:
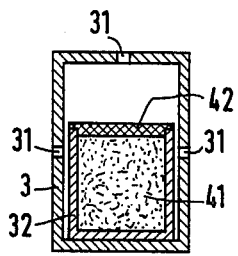
FIGS. 2a and 2b illustrate, in section, only the moisture sensor equipped with moisture detection means according to an other embodiment of the invention.
Figure 2B:
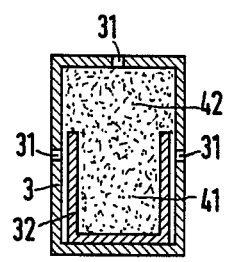

A further embodiment of the invention is shown in FIGS. 2a and 2b wherein, for clarity, the parts of the fuel rod surrounding the capsule 3 have been omitted. However, the same situation applies as in FIG. 1. In this embodiment a cup-like container or cup 32 is located in the capsule 3. The cup 32 is filled with chips or powder of a non-rusting magnetic material. The cup 32 is closed by a covering lid 42 which consists of a pressed mixture of aluminum powder and a mercury compound. If the fuel rod is intact, the situation according to FIG. 2a obtains wherein the condition of the cup 32, or more precisely, its charge 41 can be measured magnetically, as discussed in the embodiment of FIG. 1. However, it is here also possible to lift this cup within the capsule 3 with the application of a strong magnetic field and then to drop it. This action can be detected, for instance, by a suitable pick-up microphone responsive to the noise developed thereby inside the fuel rod. If, however, damage occurs to the jacket 1, cover 42, in response to moisture, decomposes as shown in FIG. 2b and the entire interior of the capsule 3 becomes filled. Therefore, there is no longer any tolerance space in which the cup 32 can move, so that the magnetic test no longer produces noise. If, therefore, no noise is detected in the testing operation, a positive and reliable indication for a defect within the fuel rod in question is provided.

Figure 3A:
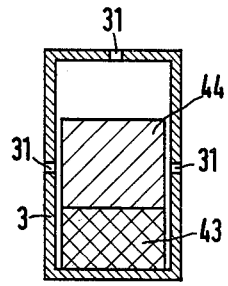
FIGS. 3a and 3b illustrate, in section, the moisture sensor equipped with moisture detection means according to still an other embodiment of the invention.
Figure 3B:
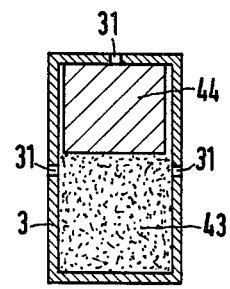

Whereas, in the embodiment according to FIGS. 1a and 1b, a decomposition of the ferromagnetic body and a change in the concentration of the ferromagnetic particles take place, FIG. 3 shows a third embodiment wherein, as in the embodiment of FIG. 2, a decomposition or change of the magnetic reluctance is unnecessary. The compact body 4 consists of two individual pellets 44 and 43 which are disposed within the capsule 3 as shown in FIG. 3a; this configuration provides a free space above the pellets. The lower pellet 43 again consists here of aluminum powder and a mercury compound, whereas the upper pellet 44 consists of a solid of ferromagnetic material which does not decompose. If a defect in the jacket occurs, the condition illustrated in FIG. 3b develops, wherein, the pellet 43 has decomposed and increased in volume to urge the ferromagnetic pellet 44 upward. The pellet 44 has been therefore moved to a new physical location that can be ascertained from outside the fuel rod by magnetic or noise measurements.

The composition of the material, as discussed above, can be caused not only by water in liquid form, but also, by steam. The material of which the capsule 3 is made and also that of the cup 32 should not be attacked by this moisture; this material must, of course, be non-magnetic. The material of the jacket 1 can be, for example, a zircon compound or stainless steel; however, a ceramic material can also be used. The capsule 3 can at the same time be used here for the mechanical support of the jacket 1. It is also possible to provide thermal insulation between the capsule 3 and the fuel charge 11 in the form of a ceramic pellet. The physical size of the capsule 3 is advantageously chosen so that a collecting space is provided for the fission gas to limit the internal pressure of the fuel rod.

What is claimed is:

1. A nuclear reactor fuel rod comprising a nonmagnetic tubular jacket having an end portion, an end cap closing said end portion, nuclear fuel in said jacket, said fuel and end cap defining therebetween a space inside of said jacket, a capsule-like housing positioned in said space, said housing being made of non-magnetic material and having at least one hole formed therethrough, a mixture of aluminum powder and a water-soluble mercury compound inside of said capsule-like housing, and ferromagnetic material inside of said capsule-like housing, said housing internally forming a space into which said mixture and said material can move.

2. The fuel rod of claim 1 in which said mixture is in the form of a compact body.

3. The fuel rod of claim 2 in which said ferromagnetic material is in the form of a powdered component of said body.

4. The fuel rod of claim 2 in which said ferromagnetic material is in the form of a pellet abutting said body.

5. The fuel rod of claim 2 in which said capsulelike housing contains a cup-like container, said body forms a covering lid for said container and said ferro-magnetic material is contained in said container.

* * * * *